United States Patent [19]
White

[11] Patent Number: 5,151,467
[45] Date of Patent: Sep. 29, 1992

[54] N-HALOTHIOSULFONAMIDE MODIFIED RUBBER PRODUCTS AND PROCESS FOR PREPARING THE SAME

[75] Inventor: Donald A. White, Edison, N.J.

[73] Assignee: Exxon Chemical Patents Inc., Linden, N.J.

[21] Appl. No.: 782,028

[22] Filed: Oct. 24, 1991

Related U.S. Application Data

[60] Division of Ser. No. 626,805, Dec. 13, 1990, abandoned, which is a division of Ser. No. 439,777, Nov. 20, 1989, Pat. No. 5,034,468, continuation-in-part of Ser. No. 244,743, Sep. 15, 1988, Pat. No. 4,956,420.

[51] Int. Cl.$^5$ .............................................. C08L 27/22
[52] U.S. Cl. .................................... 525/215; 525/194; 525/232; 525/233
[58] Field of Search ................ 525/194, 215, 232, 233

[56] References Cited

U.S. PATENT DOCUMENTS 3,915,907 10/1975 Hopper .............................. 525/351
4,956,420 9/1990 White .................................. 525/351

Primary Examiner—Christopher Henderson
Attorney, Agent, or Firm—H. L. Cohen; M. L. Gibbons; J. E. Schneider

[57] ABSTRACT

N-halothiosulfonamide-modified rubber products are provided. The modified rubber products are prepared by reaction of a rubber, such as a butyl rubber or a halogenated butyl rubber, with a N-halothiosulfonamide in the absence or in the presence of a catalyst.

3 Claims, No Drawings

N-HALOTHIOSULFONAMIDE MODIFIED RUBBER PRODUCTS AND PROCESS FOR PREPARING THE SAME

This is a division, of application Ser. No. 626,805, filed Dec. 13, 1990, now abandoned, which is a Rule 60 Divisional of U.S. patent application Ser. No. 439,777 filed Nov. 20, 1989 now U.S. Pat. No. 5,034,468 which is a continuation-in-part of U.S. patent application Ser. No. 244,743 filed Sep. 15, 1988, now U.S. Pat. No. 4,956,420 granted Sep. 11, 1990.

BACKGROUND OF THE INVENTION

1. Field of the Invention

The present invention relates to N-halothiosulfonamide-modified rubber products, particularly butyl rubber, and a process for their preparation.

2. Description of Information Disclosures

Butyl rubber is a well known product.

U.S. Pat. No. 3,915,907 (R. J. Hopper), U.S. Pat. No. 3,970,133 (R. J. Hopper), and U.S. Pat. No. 4,820,780 (R. J. Hopper), the teachings of which are hereby incorporated by reference, disclose chlorothiosulfonamide-modified terpolymers of ethylene, an alpha olefin and a non-conjugated diene. The desirability and advantages of these modified terpolymers were also disclosed in articles authored and co-authored by R. J. Hopper (Rubber Chemistry and Technology, vol. 49, pages 341–352, 1976) and International Conference on Advances in Stabilization and Controlled Degradation of Polymer, Lucerne, Switzerland, May 23–25, 1984).

It has now been found that the reaction of N-halothiosulfonamide with a rubber will produce N-halothiosulfonamide-modified rubber reaction products having improved properties.

Butyl rubber has many known desirable characteristics such as, for example, resistance to chemical attack, ozone resistance, electrical insulation capability. Improvement of the physical and dynamic properties of butyl rubber are still sought and are of practical importance. Butyl rubber does not easily form cocurable compositions with high diene rubbers such as natural rubber, styrene-butadiene rubber and the like. The modified rubber of the present invention is more readily curable with high diene content rubbers and, therefore, permits obtaining cured compositions which have the desirable characteristics of butyl rubber as well as the desirable characteristics of high diene content rubbers.

SUMMARY OF THE INVENTION

In accordance with the invention, there is provided a modified rubber product comprising:

(a) a rubber component selected from the group consisting of a polymer of an isoolefin containing from 4 to 7 carbon atoms and at least one conjugated multiolefin containing from 4 to 14 carbon atoms; a halogenated polymer of an isoolefin containing from 4 to 7 carbon atoms and at least one conjugated multiolefin containing from 4 to 14 carbon atoms; and mixtures thereof; and (b) a N-halothiosulfonamide component of the fomula:

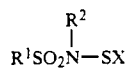

wherein X is chlorine or bromine and wherein $R^1$ and $R^2$ are selected from the group consisting of alkyl groups having from 1 to 20 carbon atoms, aralkyl groups having from 7 to 20 carbon atoms, alkaryl groups having from 7 to 20 carbon atoms, substituted aryl groups having from 6 to 10 carbon atoms, and wherein $R^2$ is also selected from the group having the formula:

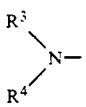

wherein $R^3$ and $R^4$ are individually selected from said alkyl, aryl, and substituted aryl grouups and wherein $R^3$ and $R^4$ can be joined together to represent groups selected from the group consisting of $-(CH_2)_n-$, wherein n is an integer ranging from 4 to 7, and $-(CH_2)_2-O-(CH_2)_2-$, said N-halothiosulfonamide component being comprised in said modified rubber product in an amount ranging from about 0.005 millimole to about 0.6 millimole per gram of said modified rubber product.

In accordance with the invention, there is also provided a process of preparing said N-halothiosulfonamide-modified rubber products which comprises the step of reacting said rubber with a sufficient amount of a N-halothio-sulfonamide of the above-stated formula under reaction conditions.

DETAILED DESCRIPTION OF THE INVENTION

The modified rubber product of the present invention comprises a rubber component and a N-halothiosulfonamide component.

The rubber components which can be used in the practice of this invention include butyl rubber, and halogenated butyl rubber, such as chlorobutyl rubber and bromobutyl rubber. Halogenated butyl rubber is typically prepared from butyl rubber.

Butyl rubber is a copolymer of an isoolefin and a conjugated multiolefin. The useful copolymers comprise a major portion of isoolefin and a minor amount, preferably not more than 30 wt. percent, of a conjugated multiolefin. The preferred copolymers comprise about 85–99.5 wt. percent (preferably 95–99.5 wt. percent) of a $C_4$–$C_7$ isoolefin, such as isobutylene, and about 15–0.5 wt. percent (preferably about 5–0.5 wt. percent) of a multiolefin of about 4–14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608–609, etc. The term "butyl rubber" as used in the specification and claims includes the aforementioned copolymers of an isoolefin having 4–7 carbon atoms and about 0.5 to 20 wt. percent of a conjugated multiolefin of about 4–14 carbon atoms. Preferably these copolymers contain about 0.5 to about 5 percent conjugated multiolefin. The preferred isoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that AlCl₃, a relatively inexpensive Freidel-Crafts catalyst is soluble in it, as are the isobutylene and isoprene comonomers. Additionally, the butyl rubber polymer is insoluble in the methyl chloride and precipitates out of solution as fine particles. The polymerization is generally carried out at temperatures of about −90° C. to −100° C. See U.S. Pat. Nos. 2,356,128 and 2,356,129 incorporated herein by reference.

The polymerization process, which is typically carried out in a draft tube reactor, is continuous. Monomer feed and catalyst are continuously introduced at the bottom of the draft tube where an axial flow pump is located. The pump circulates the slurry at high velocity to provide efficient mixing and heat transfer. Polymer slurry containing about 20-30 wt. percent butyl rubber continuously overflows from the reactor through a transfer line.

Where the desired product is the butyl rubber itself, the slurry is fed through the transfer line to a flash drum operated at about 140-180 Pa (1.38-1.58 atm) and 65°-75° C. Steam and hot water are mixed wtih the slurry in a nozzle as it enters the drum to vaporize methyl chloride and unreacted monomers which pass overhead, are recovered, and the polymer is finished by water removal and drying. Where, however, it is desired to produce a halogenated butyl rubber, this can be accomplished by preparing a solution of the rubber. Any halogenation technique may be utilized.

In one preferred method of halogenation, a "solvent replacement" process is utilized. Cold butyl rubber slurry in methyl chloride from the polymerization reactor is passed to an agitated solution in a drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation process, butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The N-halothiosulfonamide component may be present in the modified rubber product of the invention in an amount ranging from about 0.005 millimole to about 0.6 millimole, preferably from about 0.005 millimole to about 0.3 millimole per gram of the total rubber product. Thus, in commercial butyl rubber, the multiolefin, isoprene, content ranges from about 0.6 mole percent to about 2.2 mole percent. The N-halothiosulfonamide component may comprise from about 5 to 150 percent of the multiolefin (such as isoprene) content, preferably from about 5 to about 75 percent of the multiolefin content of the butyl rubber. Stated differently, the 5 to 150 percent is equivalent to 0.005 to 0.6 millimole per gram (mmole/g) of the total modified rubber. It should be noted that the addition of N-halothiosulfonamide to the butyl rubber leads to a high level of saturation of the olefinic double bond of the original butyl rubber. Some residual unsaturation is often required to permit curing the product with certain cure systems. Therefore, the preferred range of N-halothiosulfonamide component in the modified rubber ranges from about 5 to about 75 percent of the multiolefin (e.g., isoprene) content. This range is equivalent to 0.005 to about 0.3 millimole per gram of the modified rubber product.

The N-halothiosulfonamide component of the modified rubber product of the present invention may be represented by the formula:

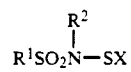

where X is chlorine or bromine, preferably chlorine (N-chlorothio-sulfonamide), where $R^1$ and $R^2$ are selected from the group consisting of alkyl radicals having 1-20 carbon atoms, aralkyl radicals having 7-20 carbon atoms, alkaryl radicals having from 7-20 carbon atoms, and aryl and substituted aryl, e.g., haloaryl, radicals having 6-10 carbon atoms and where $R^1$ is also selected from radicals having the formula

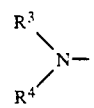

where $R^3$ and $R^4$ are individually selected from said alkyl, aralkyl, and aryl and substituted aryl, e.g., haloaryl, radicals and where $R^3$ and $R^4$ can be joined together to represent radicals selected from —CH₂—n, where n is an integer of 4 to 7, and (CH₂)₂—O—(CH₂)₂—.

In the practice of this invention, for the N-chlorothiosulfonamide, $R^1$ and $R^2$ are preferably selected from alkyl radicals having 1 to 6 carbon atoms, phenyl radicals, monoalkyl substituted phenyl radicals having from 7 to 10 carbon atoms and dialkysubstituted phenyl radicals having from 8 to 11 carbon atoms where such alkyl substituent or substituents are radicals selected from the group consisting of methyl, ethyl, and all isomeric forms of propyl and butyl radicals, and from the p-chlorophenyl radical.

Representative of radicals suitable for $R^1$ are radicals selected from methyl, tert butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methyl, tert butyl, 1-eicosyl, cyclohexyl benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

Representative examples of N-chlorothio-sulfonamides which can be used in the present invention are
N-chlorothio-N-methyl-methanesulfonamide,
N-chlorothio-N-methyl-benzenesulfonamide,
N-chlorothio-N-methyl-p-toluenesulfonamide,
N-chlorothio-N-ethyl-p-toluenesulfonamide,
N-chlorothio-N-methyl-ethanesulfonamide,
N-chlorothio-N-phenyl-p-toluenesulfonamide,
N-chlorothio-N-(2-propyl)-methanesulfonamide,
N-chlorothio-N-(1-propyl)-p-chlorobenzenesulfonamide,
N-chlorothio-N-phenyl-methanesulfonamide,
N-chlorothio-N,N',N'-trimethylsulfonamide, N-chlorothio-N-methyl-N',N'-(pentamethylene)-sulfonamide.
N-chlorothio-N-methyl-N',N',-diethylsulfonamide and
N-chlorothio-N-phenyl-benzenesulfonamide.

Chlorothiosulfonamides suitable for use as component of the modified rubber product of the present invention, as well as their preparation, have further been described in the patent literature. For example, West German DPS No. 1,156,403 shows the preparation of chlorothio-sulfonamides by reaction of a sulfonamide with $SCl_2$ in the presence of an organic acid acceptor.

West German DPS No. 1,101,407 shows the preparation of chlorothiosulfonamides from N,N'-dithiobis(-sulfonamides) and chlorine or sulfuryl chloride. The chlorothiosulfonamides of the present invention can be prepared by analogous procedures.

The preferred amount of N-halothiosulfonamide to be reacted depends on the specific butyl rubber component to be used, the specific N-halothiosulfonamide employed as well as the specific nature of other types of polymers to be used in a blend of two or more polymers and in the use of the product.

In accordance with another embodiment of the invention, there is provided a composite comprising about 100 parts by weight of the modified rubber of the invention in admixture with about 18 to about 670 parts by weight of a rubber polymer selected from the group consisting of cis-1,4-polyisoprene natural rubber, synthetic cis-1,4-polyisoprene, polybutadiene, butadiene-styrene copolymer with a butadiene/styrene mole ratio in the range of about 60/40 to about 95/5, butadiene-acrylonitrile copolymer, polypentenamer of the type derived from ring opening polymerization of cyclopentene, bromobutyl, chlorobutyl and polychloroprene and mixtures thereof. The cured composite of this embodiment is also within the scope of the present invention.

The term "CTSA" is used herein to denote any of the N-halothiosulfonamides.

Preparation Process

The modified rubber products of the invention are prepared by contacting a rubber reactant, selected from the suitable rubber components described above, with an N-halothiosulfonamide reactant selected from the groups described above, at reaction conditions, in a reaction zone. The reaction can be performed in the absence of a catalyst or in the presence of a catalyst, such as a Lewis acid. When a catalyst is used, suitable catalysts include, Lewis acid catalysts, such as, for example, catalysts based on metals of Group IIIA, IV and V of the Periodic Table of Element, including boron, aluminum, gallium, indium, zirconium, tin, vanadium, arsenic, antimony, and bismuth. The Periodic Table referred to herein is in accordance with the table published by Sargent-Welch, copyright 1968, Sargent-Welch Scientific Company. The Group IIIA Lewis Acids have the general formula $R_mMX_n$, wherein M is a Group IIIA metal, R is a monovalent hydrocarbon radical selected from the group consisting of $C_1$ to $C_{12}$ alkyl, aryl, alkylaryl, arylalkyl, and cycloalkyl radicals; m is a number from 0 to 3; X is a halogen independently selected from the group consisting of fluorine, chlorine, bromine and iodine; and the sum of m and n is equal to 3.

Nonlimiting examples include aluminum chloride, aluminum bromide, boron trifluoride, boron trichloride, ethyl aluminum dichloride ($EtAlCl_2$), diethyl aluminum chloride ($Et_2AlCl$), ethyl aluminum sesquichloride ($Et_{1.5}ACl_{1.5}$), trimethyl aluminum, and triethyl aluminum. The Group IV Lewis acids have the general formula $MX_4$, wherein M is a group IV metal and X is a ligand, preferably a halogen. Nonlimiting examples include titanium tetrachloride, zirconium tetrachloride, or tin tetrachloride. The Group V Lewis acids have the general formula $MX_y$, wherein M is a Group V metal, X is a ligand, preferably halogen, and y is an integer from 3 to 5. Nonlimiting examples include antimony pentachloride. A preferred catalyst for use in the preparation of the modified rubber of the present invention is a catalyst which comprises a salt of a weak acid. The salt of the weak acid may be represented by the formula MAn, wherein M is a metal selected from the group consisting of copper, antimony, bismuth, tin, zinc, iron and mixtures thereof. "A" is preferably an anion or mixture of anions of a weak acid and n is a number corresponding to the oxidation state of M divided by the valence of the weak acid. Preferred anions include the naphthenates, 2-ethylhexanoate, and stearates. Weak acids are generally characterized by means of the reference to "pKa". This term is a measure of completeness of the dissociation of the acid, Ka being the equilibrium constant of the dissociation of the acid, and the value pKa being the negative of the logarithm (to the base 10). For the purpose of this invention, weak acids are those whose pKa are greater than about 4.0. Weak acids useful in the present invention include $C_4$ to $C_{20}$ saturated mono- or polycarboxylic acids; in particular, a carboxylic acid selected from the group consisting of caproic, caprylic, lauric, stearic, 2-ethylhexanoic, neodecanoic, and naphthenic.

The catalysts may be used singly or in combination with co-catalysts, such as for example, salts of calcium or magnesium which moderate the crosslinking activity of the Lewis acids.

A sufficient amount of the N-halothiosulfonamide is used to contact the rubber component and to react with the rubber component to produce a modified rubber product comprising in its structure from about 0.005 to about 0.6, preferably from about 0.005 to about 0.3 millimole of the N-halothiosulfonamide per gram of the resulting modified rubber product. For example, the N-halothiosulfonamide reactant is introduced into the reaction zone in an amount one to three times the amount of this component that is desired to be in the modified rubber product.

The reaction of the N-halothiosulfonamide with the rubber may be performed in a solution, in a swelling method, that is, preparing a solution of CTSA in a suitable solvent, which solvent also causes the rubber to swell, or in a melt phase reaction. Preferably, the reaction is performed in a melt phase reaction, at a residence time, in the reaction zone, ranging from about 0.05 to 20, preferably 0.2 to 10 minutes and a reaction zone temperature ranging from about 40 to about 170° C., preferably from about 60° to about 130° C.

The modified rubber product produced by the process of the present invention, after its initial formation, may undergo a partial dehydrohalogenation under certain conditions, such as high temperature.

It is within the scope of the present invention to include the partially dehydrohalogenated modified rubber products as products of the present invention.

Reaction of the CTSA with the rubber component can be achieved using both solution and melt phase (or neat) processes. One method involves addition of the chlorothiosulfonamide to a solution of the rubber in an inert organic solvent such as heptane, hexane, cyclohexane, methyl cyclohexane, chloroform, benzene or toluene. A mixture of nonpolar solvent with a highly polar solvent may be used advantageously; for example, a mixture of 40 volumes of hexane and 1 volume of acetic acid can produce substantially faster formation of the reaction product as compared to hexane alone.

Another method comprises directly blending the CTSA with the rubber component by mixing means such as an internal mixer (Banbury ®, Brabender ® or extruder type) or an open roll mill. For direct mixing, it is advantageous to suspend or dissolve the CTSA in a relatively inert medium such as mineral oil or chlorinated paraffin in order to improve dispersion as well as minimize hydrolysis by atmospheric moisture. It is particularly important that the reaction be carried out using reactants (rubber, CTSA) and diluents, if any, which have been thoroughly and uniformly dried to avoid erratic reactivity and/or the formation of undesirable by-products due to hydrolysis of CTSA and the formation of $SO_2$, HCl or HBr and elemental sulfur. In the most preferred procedure all traces of moisture are removed. As a practical matter in view of large scale production and handling, it is preferred that the rubber moisture be less than about 0.1 weight percent, more preferably less than about 0.05 weight percent, most preferably less than about 0.01 weight percent.

The reaction is preferably carried out at the lowest temperature commensurate with the extent of reaction desired and in view of reasonable reaction times as well as polymer processing/flow and polymer degradation, particularly when the reaction is conducted in the melt. Solution reaction can be carried out at from about 10° C. to about 170° C., preferably about 20° C. to about 80° C., with ambient temperature being convenient and practical. Reactions conducted in the melt phase are preferably carried out at about 40° C. to about 170° C.; more preferably about 50° C. to about 150° C.; most preferably about 60° C. to about 130° C.

Melt phase reactions are preferably carried out in equipment and in processes as taught in U.S. Pat. Nos. 4,513,116; 4,548,995; 4,554,326 and 4,563,506 incorporated herein by reference and adapted to the specific requirements of the reaction and reactants herein. These references describe reaction of polymers in a continuous flow device such as an extruder, for example, a twin screw extruder. In the present process, a neat rubber, or one with a limited amount of diluent, is caused to react with the reagent, CTSA, to produce a useful product. For the purposes of this invention the terms melt phase and bulk phase are used interchangeably. Furthermore, it is to be understood that reference to the reaction of a neat rubber in the melt (or in a melt phase process) includes rubber with a limited amount of diluent. The use of a diluent is discussed below in conjunction with the feed zone of an extruder process for carrying out the invention. The rubber is a highly viscous material and the CTSA is, under typical reaction conditions, a low viscosity fluid.

The rubber component and CTSA are preferably contacted, or reacted, in the absence or presence of a catalyst in a continuous flow device. Suitable devices include kneaders, extruders (employing single or multiple screws, e.g., twin screws), continuous mixers and a blending/extrusion device referred to as a cavity transfer mixer (see, e.g., European Rubber Journal, July-August, 1982, pages 29-32 and G. M. Gale, U.K. Patent Application 8030586, 1980 and U.S. Pat. No. 4,419,014). Although the rubber can attain very high viscosities, even at relatively high temperatures, such devices are capable of sufficiently deforming the rubber to achieve the necessary degree of mixing and reaction.

The continuous flow device should be capable of initially forming the rubber feed into a cohesive mass and then deforming the rubber, disrupting the rubber surface, thereby exposing fresh, i.e., unreacted, rubber to the CTSA. The exposure of new surface does not necessarily require the use of high speeds where, e.g., an extruder is used. However, surface disrupting means are preferably employed, for example, pins, reverse flow sections, a "Maillefer" screw design, the cavities of a cavity transfer mixer, multiple flight screw section, interrupted flight sections, e.g., slotted flights, and combinations thereof. In this manner, efficient mixing and contact between the rubber and CTSA are achieved at the lowest temperature consistent with achieving the desired extent of reaction. As a consequence, undesirable rubber degradation is avoided as are side reactions which may result in, e.g., crosslinking of the rubber.

CTSA is fed to the reaction zone, preferably by means of a separately controllable feed line. It is metered into the reaction zone so as to be present at the desired concentration, taking into consideration the rubber feed rate. Typically, feed rates (based on 100 kg per hour of rubber) of about 0.1 to 15 weight percent are useful, preferably about 0.5 to about 5 weight percent. Temperature is controlled in the range of about 25° C. to about 130° C. so that the CTSA is preferably in a liquid state to facilitate feed control and mixing. Particularly useful CTSA has a melting point of about 20°-30° C. at ambient pressure, so that it can readily handled as a liquid at moderately elevated temperature.

When a catalyst is used, the catalyst can be fed to the reaction zone by various convenient means: it can be predispersed at the desired concentration in the rubber or the CTSA or both; it can also be introduced as a separate feed stream into the feed zone and/or the reaction zone. Preferably, the catalyst is introduced by blending it with the rubber prior to introducing the CTSA into the continuous flow device.

When the region in which the rubber and CTSA are brought into contact, e.g., the reaction zone of an extruder, is not completely filled with rubber, the CTSA and the rubber are present as either discontinuous or continuous phases; a discontinuous rubber phase is preferred. A preferred operating mode of the process utilizes a reaction zone which is only partially filled with rubber; this permits reaction by-products to disengage from the rubber phase and facilitates contact between CTSA and newly generated rubber surface. Generally, the rubber is present so that it fills the available volume of the reaction zone to the extent of about 5 to about 95 percent, preferably 10 to about 75 percent, more preferably about 15 to about 50 percent, for example 20 to about 35 percent of the reaction zone.

One means of achieving a partially filled reaction zone is to feed, in a controlled manner, less rubber into the reaction zone than the conveying capacity of the zone. The space around the rubber is occupied in part by the CTSA and, as fresh surface is exposed to the CTSA, reaction occurs. In a preferred embodiment, utilization of vent means at a downstream position in the reaction zone facilitates removal of by-products.

Downstream of the reaction zone, vent means are provided to remove unwanted and undesirable reaction by-products, including HCl, HBr, and $SO_2$, in the event any are formed by hydrolysis of CTSA due to, for example, the presence of moisture in the system. In a preferred embodiment, disengagement is achieved by injection of an inert gas, e.g., nitrogen, argon, carbon dioxide or dry air into said continuous flow device. The injection point or points for the inert gas may be downstream and/or upstream of the vent means. In another preferred embodiment, disengagement is made more efficient by imposing a vacuum on the vent means. The vent means may comprise one or more separate venting sections. In the case of multiple venting sections, it is preferable to provide appropriate screw elements between the vents to form a rubber seal between the individual venting sections.

Rapid and complete disengagement is effected by employing process features such as those described earlier with regard to reaction in order to achieve rubber deformation and surface disruption so as to expose fresh rubber surface to the inert gas. In a preferred embodiment, disengagement occurs in a region of the continuous flow device which is not completely filled with rubber. In a still more preferred embodiment, vent means are provided so that the inert gas and by-products are removed from the rubber conveying means. The amount of inert gas employed can be readily determined and should be an amount effective for the disengagement without being unnecessarily wasteful; inert gas injection can be achieved using more than one injection port. In another embodiment, the inert gas injection and venting configuration are designed so as to permit explosive release of the injected inert gas from the reacted rubber in order to facilitate in the removal of unwanted materials. Another option is a region for injecting a rubber stabilizer into the continuous flow device. Filter means can also be employed to remove undispersed material from the modified rubber.

Preferably, the various zones which have been described are separated from one another in such a manner as to permit maximum independent control of conditions in each zone. For example, a seal comprising rubber melt is formed between the feed zone and reaction zone so as to avoid "blow back" of CTSA. A rubber melt seal may also be provided to allow separation between multiple vent zones. The means of achieving such a rubber melt seal are well known to those skilled in the art of polymer processing.

DESCRIPTION OF THE PREFERRED EMBODIMENT

Details and conditions are described below for a preferred embodiment utilizing an extruder-reactor, but the principles disclosed are broadly applicable to the general process. It is to be understood that reference to the screw of an extruder is to include both single and multiple (e.g., twin) screw extruders, intermeshing and nonintermeshing as well as co- and counterrotating screws. The extruder-reactor may be though of as carrying out the rubber modification in various operating zones:

(A) Feed Zone—in which rubber is introduced into the extruder-reactor in convenient form. This form includes, for example, particles from bales of rubber which have been comminuted, particles and/or pellets of rubber which may be in stable form as produced and crumb from the finishing line of a rubber manufacturing plant, each of which is preferably free of reactive contaminants, e.g., moisture and reactive hydrocarbons.

The feed zone is designed to form the rubber feed into a cohesive mass and convey or pump the mass past a restrictive dam which follows the feed zone and distinguishes it from the reaction zone which follows. This operation should be conducted at low shear and temperature consistent with the desired result and at a pressure sufficient to convey the mass, typically up to about 600 psig, preferably up to about 400 psig, most preferably up to about 200 psig. Lower pressures and shearing forces are preferred. This can be achieved, e.g., by utilizing extruder screws with relatively deep flights and by keeping the length, as short as possible commensurate with desired production rates. For example, rubber can be introduced at about room temperature and exit from the feed zone at about 40° to 150° C.

A restrictive dam is used to separate the feed zone from the reaction zone which follows it so as to prevent back leakage of reactants. This dam is not restrictive enough, however, to cause excessive overheating of the rubber. A restrictive dam can be, for example, a reverse flighted screw section, a filled screw section (also referred to as a compounder), a shallow flighted screw section, an unflighted screw section, combinations thereof, or other means known in the art. An unflighted screw section is preferred, and it can have a larger diameter than the root diameter upstream of it, for example 5-25 percent larger, but not greater than the screw flight diameter. If a reverse flighted screw section is employed it can be single or multi-flighted, preferably multi-flighted.

In addition to the rubber which is introduced into the feed zone, an optional diluent may also be added. A diluent can function to reduce the viscosity of the rubber to a level commensurate with subsequent good mixing and reaction without the necessity for excessive heat generation and a risk of molecular weight breakdown and undesirable side reactions. The diluent may be volatile saturated hydrocarbon, chlorohydrocarbon or chlorocarbon such as pentane, hexane, methylene chloride, chloroform, or carbon tetrachloride. It may also be a non-hydrocarbon, readily removable from the system downstream, but able to perform the function of temporarily reducing the apparent viscosity of the rubber in the reaction zone. Examples of suitable materials include inert gases such as nitrogen and argon, as well as gases such as carbon dioxide and air.

A diluent different in kind from those described above, but also suitable may also be retained with or in the rubber, such as a hydrocarbon oil. Suitable oils include saturated aliphatic oil and rubber process oils that are essentially saturated; the oil should not react with the CTSA. Where such oils are utilized, the modified rubber would contain oil after recovery and drying and would commonly be referred to as "oil extended". Oil extended rubber is well known in the art and various grades of oil extended rubbers made by other means are commercially available. Such products are particularly useful where it is desirable, for example, to extend the rubber with high levels of filler, e.g., carbon black or mineral filler, to obtain properties from high molecular weight rubber which might otherwise be difficult to process because of its inherently high viscosity, etc.

The total amount of diluent, including that which may be present in the feed should not be greater than about 50 wt. percent based on the rubber, preferably less than about 15 wt. percent, most preferably about 5 to about 10 wt. percent.

If desired, a catalyst may be used. When a catalyst is used, it can be blended with the rubber prior to the rubber being fed to the extruder and/or it can be added as a separate feed stream. If as a separate stream, it is preferred that the catalyst be dispersed or dissolved in a carrier diluent to facilitate flow control. Suitable diluents include mineral oil and hydrocarbon, diluents inert to the reaction, for example, halogenated hydrocarbons.

(B) Reaction Zone-can generally be described as the zone in which the CTSA is caused to react with the rubber to complete the grafting reaction while simultaneously minimizing undesired side reactions. Screw configuration in the reaction zone is important to mixing efficiency and achievement of the overall objectives of the process. The configuration should be such as to cause disruption and reorientation of the flow of rubber, as, for example, by the aforementioned use of reverse flights, multiple reverse flights, pin sections, a series of very short alternating reverse and forward screw sections, multiple flight, interrupted flight sections and combinations thereof, and other designs known in the art to improve mixing. Viscosity control of the rubber, effected, in part, by the use of an optional diluent and by control of the molecular weight of the rubber and the rubber temperature as it enters the reaction zone, also determines, to a large extent, deformability. Selection of the temperature level influences the reaction and, along with residence time in the reaction zone, the nature of the end product. For maximum economy and continuity of production the choice of materials of construction of the reaction zone is particularly important; this also influences the type and level of potential contaminants in the finished rubber and their influence on long-term storage stability of the rubber as well as chemical reactivity.

Control is required in order to optimize residence time and avoid rubber degradation and gelation. This can be achieved by, for example, controlling the CTSA feed rate in comparison to the rubber feed rate, design of the reaction zone (length, screw features and configuration, injection means, temperature, etc.) and RPM so as to determine time of reaction and to control the relative rates of the desired reaction versus competing side reactions and gelation.

The CTSA can be gaseous, liquid or solid and may be added either in a pure state or diluted with a suitable inert fluid. In this process, alternative reaction zone mixing techniques are feasible. Injecting CTSA at a point or points filled with rubber can be employed. Similarly, the reaction is allowed to occur at the continuously renewing rubber surface generated by the configuration of the reaction zone and conveying means, e.g., the extruder screw and barrel, in a reaction zone partially filled with rubber. Configuration of the screw and chamber walls should not be so restrictive as to cause excessive pressure and excessive shear heating of the rubber. Pressure at the point of injection need not be very high where the reaction zone is only partially filled with rubber and preferably vented. In addition, injection can be into the space not occupied by the rubber. A moderately positive injection pressure is suitable; the pressure selected should maintain a positive flow into the reaction zone and prevent plugging of the line. The specific pressure chosen is a matter of operating convenience. Generally, pressure at the point of injection is about 15 to about 400 psig.

Also important for achieving efficient reaction of the rubber and CTSA is the incorporation in the reaction zone of means to produce the level of rubber mixing and surface disruption preferred for the practice of this invention. As described earlier, this can be achieved, for example, by utilizing reverse flights on the reaction zone portion of the extruder screw, pins, etc. Other means, useful in combination with equipment design features, include operation of the screw at a rotation rate (using, for example, a 2 inch diameter screw) of about 50 to about 600 RPM, preferably about 70 to about 400 RPM, most preferably about 90 to about 350 RPM (revolutions per minutes).

When a catalyst is optionally used, catalyst addition can also be accomplished in the reaction zone, although with more difficulty insofar as achieving satisfactory dispersion. In such circumstances, addition at a point near the feed zone is preferred in order to allow maximum opportunity for mixing.

Overall, it is desirable, by control of rubber viscosity, chamber and screw design, screw RPM, and operating pressure, to prevent excessive temperatures in the reaction zone while maintaining a high level of mixing. It is desirable that a reaction temperature of less than about 170° C. be achieved, preferably about 40° C. to about 170° C., more preferably about 50° C. to about 150° C., most preferably about 60° C. to about 130° C. Residence time in the reaction zone generally ranges from about 0.05 to about 5, preferably from about 0.05 to about 3 more preferably from about 0.05 to about 1 minutes.

(C) Sweep Zone-in which residual by-product $SO_2$ and HCl and/or HBr are swept out of the extruder to avoid corrosion of the equipment. Suitable means to effect removal of these materials is the injection of an inert gas into the extruder. This is effected by employing process features such as those just described with regard to the reaction zone in order to disrupt the rubber surface and continually expose new surface to the inert gas in the sweep zone. In a preferred embodiment vent means are provided in this zone to permit the inert gas and disengaged materials to be swept out and immediately removed from the system. In a particularly preferred embodiment, the screw configuration in the region of the vent comprises a deep, single flighted screw with little or no mixing occurring in the vicinity of the vent in order to avoid restricting the exiting flow of inert gas and disengaged materials. In another preferred embodiment, various additives and/or stabilizers are added to the rubber in the sweep zone. As discussed earlier, multiple injection sites can be used as well as a supplementary injection zone. In another embodiment, pressure in the system is controlled in order to remove explosively the unwanted products by maintaining pressure in the system up to the region of the vent where it is allowed to be rapidly reduced to ambient.

The sweep zone is designed so that the inert gas contacts the reaction products from the reaction zone as soon as possible after the grafting reaction. This is achieved when, e.g., a dam is used between the reaction and sweep zones, by having it as short as possible consistent with its functioning as a restrictive dam. The nature and configuration of various alternatives for the restrictive dam are described above for the dam between the feed and reaction zones. The injection port for the inert gas can be located as close as possible to the downstream end of the dam or the sweep gas can be injected so as to flow countercurrently to the flow of the grafted product mixture. Additionally, the sweep gas can first be injected into the reaction zone, downstream of CTSA introduction to effect the initial removal of by-products using the methods just described.

Rubber stabilizing agents can, optionally, be added in this zone. This can be done by incorporating the stabilizers at an injection point. Suitable stabilizers include those known in the art for stabilizing halogenated polymers.

(D) Exit Zone-preferably the extruder-reactor comprises a final exit zone (D) in which the temperature of the modified rubber product is adjusted for delivery therefrom at a temperature below about 170° C., more preferably below about 150° C. and most preferably below about 130° C., as a contribution to the stability of the rubber. Also in the exit zone, stabilizer(s) may initially be added to the swept rubber product if not added in the sweep zone, or additional stabilizer(s) can be added.

In addition to the extruder-reactor features just described, the process of this invention can also incorporate a system for recycling any organic diluent that may be added to the feed zone and/or included with the CTSA and, optionally, means for back-mixing the modified rubber to assure that the final packaged rubber is a homogeneous product.

Materials of construction in the feed zone, reaction zone and sweep zone are selected from those well known in the art to prevent or minimize reaction of the equipment with CTSA, $SO_2$, HBr and/or HCl, in view of safety considerations as well as long equipment life.

The modified rubbers of this invention can be processed in standard equipment used for each such rubbers, such as internal mixers (e.g., Banbury®), mills, extruders, calenders, etc. Said rubbers are amenable to conventional compounding practice and various fillers and extenders can be incorporated, e.g., various carbon blacks, clays, silicas, carbonates, oils, resins, waxes, etc. The modified rubber of this invention may be fully or partially cured or vulcanized by any of the prior art methods suitable for rubbers, e.g., using sulfur, sulfur-containing curing agents (such as, benzothiazyl disulfide, tetramethylthiuram disulfide, etc.) as well as cure systems using alkyl phenol resins, etc., and mixtures thereof. Curing is usually accomplished at a temperature of from about 100° C. to about 185° C., preferably 150° C. to about 200° C., and usually takes from 1 to 150 minutes. The modified rubber is particularly useful in blends with high unsaturation rubbers, e.g., styrene-butadiene (SBR), polyisoprene, polybutadiene, etc., as well as lower functionality rubbers such as bromobutyl and chlorobutyl, and is particularly useful in tire applications, e.g., tire sidewalls (see e.g., U.S. Pat. No. 3,970,133).

The practice of this invention is further illustrated by reference to the following examples. All parts and percentages herein are by weight, unless otherwise indicated.

EXAMPLE 1

A solution of isobutylene isoprene copolymer Exxon® Butyl grade 365 with an unsaturation level of 0.36 mmole/g, (45 g); N-chlorothio-N-methylbenzenesulfonamide (1.50 g; 97% purity; 6.13 mmole) and copper naphthenate (1.50 g; 8% copper) in heptane (1000 ml) was refluxed under dry nitrogen for 3 h. The modified polymer was recovered by precipitation with acetone and dried in air. Elemental analysis showed: Cl, 0.21; N, 0.09; S, 0.39%, corresponding to a Cl:N:S atomic ratio of 1.00:1.08:2.05. Within experimental error, this is the same Cl:N:S ratio as that of the CTSA reagent. These results indicate reaction without dehydrohalogenation. Based on the average of the elemental analyses, the thiosulfonamide content of the product was 0.061 mmole/g.

The resulting modified polymer, which is a rubber product of the invention, had a Mooney viscosity (ML, 1+8, 100° C.) of 48 compared to a value of 47 for the unmodified polymer.

EXAMPLE 2

This was carried out in the manner of Example 1, except that the sulfonamide was increased to 3.00 g. Elemental analysis showed: Cl, 0.27; N, 0.16; S, 0.70%, corresponding to a Cl:N:S ratio of 1.00:1.50:2.87. This appears to indicate reaction of the CTSA reagent with significant (about 33%) dehydrohalogenation of the initially formed modified rubber product of the type produced in Example 1. Based on the average of the N and S analyses, the thiosulfonamide content of the modified rubber product was 0.11 mmole/g.

The resulting modified polymer, which is a rubber product of the invention, had a Mooney viscosity (ML, 1+8, 100° C.) of 49 compared to a value of 47 for the unmodified polymer.

EXAMPLE 3

Modified polymers prepared by the methods of Examples 1 and 2 were evaluated for vulcanization performance and compared to the unmodified feed polymer. The following formulation was used for evaluation purposes: 149 g of Butyl 365 polymer (modified or unmodified); 60 g of synthetic polyisoprene; 100 g of carbon black (ASTM grade, N-550). The ingredients were mixed in a Banbury mixer for 4 minutes with rotor speed adjusted so that the composition temperature did not exceed 125° C.

A portion of each of the mixed compositions (154.5 g) was blended with stabilizers and curatives on a rubber mill, adjusting speed and mill roll separation such that the composition temperature did not exceed 105° C. The stabilizers and curatives used were: 1.0 g of butylated octylphenol; 4 g of zinc oxide; 2.3 g of stearic acid; 1.5 g of sulfur; 1.0 g of 2-(4-morpholinodithio)benzothiazole; 0.05 g of tetramethylthiuram disulfide.

A sample of each composition was tested using a Monsanto® oscillating disc cure rheometer using the following settings: 1 degree arc, 60 min. time range, 100 in. lbs., torque range, 100 cycles, standard size die and 150° C. temperature. Test results were as follows:

| Sample | Unmodified Butyl 365 | Modified (Ex. 1) | Modified (Ex. 2) |
| --- | --- | --- | --- |
| Max. Torque (in. lbs) | 22 | 29 | 32 |
| Min. Torque (in. lbs) | 6 | 7 | 9 |
| 90% Max. Torque (in. lbs) | 19.8 | 26.1 | 28.8 |
| T90 (min) | 6.8 | 16.0 | 16.0 |
| T5 (min) | 3.3 | 3.4 | 3.9 |

T90 indicates the time required to reach 90% of the maximum torque and T5 the time required for the torque to increase 5 units above the minimum torque.

The large increase in maximum torque for the modified polymer versus the unmodified polymer is indicative of cocuring of the modified polymer with the high diene content synthetic polyisoprene. Such improved performance makes the modified polymers of the invention particularly useful where blends with highly unsaturated rubbers are used, for example, tires and tire sidewalls.

EXAMPLE 4

A solution of Butyl 365 isobutylene-isoprene copolymer (15 g) in heptane (300 g), and N-chlorothio-N-methylbenzenesulfonamide (0.5 g) was refluxed under dry nitrogen for 1 hour.

A small sample was treated with acetone to precipitate the modified polymer. After drying in air, its infrared spectrum was recorded and the ratio of the absorbances of peaks at about 710 cm$^{-1}$ (due to bound sulfonamide moieties) and at about 940 cm$^{-1}$ (due to the Butyl 365) was measured. The absorbance ratio was found to be 0.082. Comparing this to the similar ratio (0.163) for the product from Example 1, the bound sulfonamide was estimated at about 0.031 mmole/g, demonstrating the uncatalysed sulfonamide addition reaction of the process of the present invention. The modified rubber product of example 4 is a product of the present invention.

EXAMPLE 5

This Example was carried out in the manner of Example 4, except that copper naphthenate (0.5 g) was included in the reaction mixture. The bound sulfonamide, estimated by infrared spectroscopy was 0.064 mmole/g, showing that higher conversions can be obtained in a catalysed reaction (compare to Example 4). The modified rubber product of example 5 is a product of the present invention.

EXAMPLE 6

This Example was carried out in the manner of Example 5 except that the rubber used was isobutylene isoprene copolymer (Butyl 268) with an unsaturation level of 0.27 mmole/g; 15 g. The bound sulfonamide, estimated by infrared spectroscopy was 0.062 mmole/g. The resulting modified rubber product of example 6 is a product of the present invention.

What is claimed is:

1. A composite comprising about 100 parts by weight of a modified rubber product, said modified rubber product comprising
   (a) a rubber component selected from the group consisting of a polymer of an isoolefin containing from 4 to 7 carbon atoms and at least one conjugated multiolefin containing from 4 to 14 carbon atoms; a halogenated polymer of an isoolefin containing from 4 to 7 carbon atoms and at least one conjugated monoolefin containing from 4 to 14 carbon atoms; and mixtures thereof; and
   (b) a N-halothiosulfonamide component of the formula:

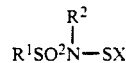

Wherein X is chlorine or bromine, and wherein $R^1$ and $R^2$ are selected from the group consisting of alkyl groups having from 1 to 20 carbon atoms, aralkyl groups having from 7 to 20 carbon atoms, substituted aryl groups having from 6 to 10 carbon atoms, and wherein $R^2$ is also selected from a group having the formula:

Wherein $R^3$ and $R^4$ are individually selected from said alkyl, aryl, and substituted aryl groups and wherein $R^3$ and $R^4$ can be joined together to represent groups selected from the group consisting of $$-(CH_2)_n-.$$

wherein n is an integer ranging from 4 to 7 and $$-(CH_2)_2-O-(CH_2)_2-,$$

said N-halothiosulfonamide component being comprised is said modified rubber product in an amount from about 0.005 millimole to about 0.6 millimole per gram of said modified rubber product, in admixture with about 18 to about 670 parts by weight of a rubbery polymer selected from the group consisting of cis-1,4-polyisoprene natural rubber, synthetic cis-1,4-polyisoprene, polybutadiene, butadiene-styrene copolymer with a butadiene to styrene mole ratio in the range of about 60 to 40 to about 95 to 5, butadieneacrylonitrile copolymer, polypentenamer of the type derived from open ring polymerization of cyclopentene, bromobutyl rubber, chlorobutyl rubber and polychloroprene and mixtures thereof.

2. The cured composite of claim 1.

3. The partially dehydrohalogenated modified rubber product which is partially dehydrogenated of claim 1.

* * * * *